US012626056B2

(12) United States Patent
Bursztyn et al.

(10) Patent No.: US 12,626,056 B2
(45) Date of Patent: May 12, 2026

(54) GENERATING NATURAL LANGUAGE MODEL INSIGHTS FOR DATA CHARTS USING LIGHT LANGUAGE MODELS DISTILLED FROM LARGE LANGUAGE MODELS

(71) Applicant: Adobe Inc., San Jose, CA (US)

(72) Inventors: Victor Soares Bursztyn, Mountain View, CA (US); Wei Zhang, Great Falls, VA (US); Prithvi Bhutani, Lynnwood, WA (US); Eunyee Koh, Sunnyvale, CA (US); Abhisek Trivedi, Lehi, UT (US)

(73) Assignee: Adobe Inc., San Jose, CA (US)

( * ) Notice: Subject to any disclaimer, the term of this patent is extended or adjusted under 35 U.S.C. 154(b) by 283 days.

(21) Appl. No.: 18/338,033

(22) Filed: Jun. 20, 2023

(65) Prior Publication Data

US 2024/0320421 A1     Sep. 26, 2024

Related U.S. Application Data

(60) Provisional application No. 63/491,400, filed on Mar. 21, 2023.

(51) Int. Cl.
*G06F 40/186*     (2020.01)
*G06N 3/096*     (2023.01)

(52) U.S. Cl.
CPC ........... *G06F 40/186* (2020.01); *G06N 3/096* (2023.01)

(58) Field of Classification Search
None
See application file for complete search history.

(56) References Cited

U.S. PATENT DOCUMENTS 7,835,911 B2 *  11/2010  Balchandran ......... G06F 40/237
                                                704/275
9,286,290 B2 *   3/2016  Allen ................... G06F 40/205
                        (Continued)

FOREIGN PATENT DOCUMENTS

CN       115456146 A  * 12/2022  ............... G06N 3/08
WO  WO-2021260650 A1 * 12/2021  ............. G06T 11/60

OTHER PUBLICATIONS

Moss, Henry B., David S. Leslie, and Paul Rayson. "Using JK fold cross validation to reduce variance when tuning NLP models." arXiv preprint arXiv:1806.07139. (Year: 2018).*
(Continued)

*Primary Examiner* — Pierre Louis Desir
*Assistant Examiner* — Sean Thomas Smith
(74) *Attorney, Agent, or Firm* — Keller Preece PLLC

(57) ABSTRACT

The present disclosure relates to systems, methods, and non-transitory computer readable media for generating naturally phrased insights about data charts using light language models distilled from large language models. To synthesize training data for the light language model, in some embodiments, the disclosed systems leverage insight templates for prompting a large language model for generating naturally phrased insights. In some embodiments, the disclosed systems anonymize and augment the synthesized training data to improve the accuracy and robustness of model predictions. For example, the disclosed systems anonymize training data by injecting noise into data charts before prompting the large language model for generating naturally phrased insights from insight templates. In some embodiments, the disclosed systems further augment the (anonymized) training data by splitting or partitioning data charts into folds that act as individual data charts.

20 Claims, 11 Drawing Sheets

(56) References Cited

U.S. PATENT DOCUMENTS

| | | | | |
|---|---|---|---|---|
| 9,396,181 | B1 * | 7/2016 | Sripada | G06F 40/134 |
| 9,529,795 | B2 * | 12/2016 | Kondadadi | G06F 40/56 |
| 10,572,473 | B2 * | 2/2020 | Allen | G06F 16/243 |
| 11,423,680 | B1 * | 8/2022 | Jade | G06F 16/353 |
| 11,829,705 | B1 * | 11/2023 | Rony | G06F 40/186 |
| 12,271,792 | B2 * | 4/2025 | Li | G06N 3/09 |
| 12,346,665 | B2 * | 7/2025 | Merler | G06N 3/092 |
| 2015/0309990 | A1 * | 10/2015 | Allen | G06F 40/177 |
| | | | | 704/9 |
| 2016/0328395 | A1 * | 11/2016 | Lani | G06F 40/106 |
| 2017/0371856 | A1 * | 12/2017 | Can | G06V 30/19173 |
| 2018/0267960 | A1 * | 9/2018 | Rajendran | G06F 40/30 |
| 2020/0134074 | A1 * | 4/2020 | Mankovskii | G06F 16/26 |
| 2021/0097062 | A1 * | 4/2021 | Mishra | G06N 20/00 |
| 2021/0240702 | A1 * | 8/2021 | Mei | G06F 16/2425 |
| 2021/0350068 | A1 * | 11/2021 | Sanossian | G06Q 10/063 |
| 2022/0092508 | A1 * | 3/2022 | Suthan | G06F 16/26 |
| 2022/0269869 | A1 * | 8/2022 | Duffy | G06F 40/279 |

OTHER PUBLICATIONS

Brown, T., et al. "Language Models are Few-Shot Learners". Advances in Neural Information Processing Systems, 34th Conference on Neural Information Processing Systems, 1877-1901. (Year: 2020).*

Raffel, Colin, et al. "Exploring the limits of transfer learning with a unified text-to-text transformer." Journal of machine learning research 21.140. (Year: 2020).*

Roberts, Adam, et al. "How Much Knowledge Can You Pack Into the Parameters of a Language Model?". In Proceedings of the 2020 Conference on Empirical Methods in Natural Language Processing (EMNLP), pp. 5418-5426. (Year: 2020).*

Chung, Hyung Won, et al. "Scaling Instruction-Finetuned Language Models". arXiv preprint arXiv:2210.11416. (Year: 2022).*

Fan, Angela, David Grangier, and Michael Auli. "Controllable abstractive summarization." proceedings of the 2nd workshop on neural machine translation and generation. 2018. (Year: 2018).*

Moss, Henry B., David S. Leslie, and Paul Rayson. "Using JK fold cross validation to reduce variance when tuning NLP models." arXiv preprint arXiv:1806.07139 (2018). (Year: 2018).*

Raffel, Colin, et al. "Exploring the limits of transfer learning with a unified text-to-text transformer." Journal of machine learning research 21.140 (2020): 1-67. (Year: 2020).*

Brown, Tom, et al. "Language models are few-shot learners." Advances in neural information processing systems 33 (2020): 1877-1901. (Year: 2020).*

Roberts, Adam, Colin Raffel, and Noam Shazeer. "How much knowledge can you pack into the parameters of a language model?." arXiv preprint arXiv:2002.08910 (2020). (Year: 2020).*

Liu, Zhengyuan, and Nancy Chen. "Controllable neural dialogue summarization with personal named entity planning." Proceedings of the 2021 Conference on Empirical Methods in Natural Language Processing. 2021. (Year: 2021).*

Tsai, Alicia, et al. "Style control for schema-guided natural language generation." Proceedings of the 3rd Workshop on Natural Language Processing for Conversational AI. 2021. (Year: 2021).*

Chung, Hyung Won, et al. "Scaling instruction-finetuned language models." arXiv preprint arXiv:2210.11416. Dec. 6, 2022, pp. 1-54. (Year: 2022).*

Brown, T., et al. Language models are few-shot learners. Advances in Neural Information Processing Systems, 34th Conference on Neural Information Processing Systems, (2020), 1877-1901.

Chung, Hyung Won. Et al. "Scaling instruction-finetuned language models". arXiv preprint arXiv:2210.11416. Dec. 6, 2022, pp. 1-54.

Raffel, Colin, et al. "Exploring the limits of transfer learning with a unified text-to-text transformer". Journal of Machine Learning Research 21., Jun. 2020, 1-67.

Roberts, Adam, et al. "How Much Knowledge Can You Pack Into the Parameters of a Language Model?". In Proceedings of the 2020 Conference on Empirical Methods in Natural Language Processing (EMNLP), pp. 5418-5426. Oct. 5, 2020.

Wei, Jason, et al. "Emergent abilities of large language models." arXiv preprint arXiv:2206.07682. Published in Transactions on Machine Learning Research. pp. 1-30. Oct. 26, 2022.

Wiggers, Kyle, "Open AI's massive GPT-3 model is impressive, but size isn't everything," VentureBeat, webpage: <https://venturebeat.com/ai/ai-machine-learning-openai-gpt-3-size-isnt-everything/>, 5 pages. Jun. 1, 2020.

Yujian, L., et al. "A normalized Levenshtein distance metric." IEEE transactions on pattern analysis and machine intelligence, 29(6), pp. 1091-1095. Jun. 2007.

* cited by examiner

| Method (# of parameters) | Insight Consciousness | | Vocabulary Diversity |
| --- | --- | --- | --- |
| | Avg # of Chars per Insight | Avg # of Sents per Insight | # of Unique Tokens |
| Template-based (0) | 160.2 | 1.39 | 105 |
| Fine-Tuned Flan-TS XL | 147.6 | 1.19 | 229 |
| Fine-Tuned Flan-T5 Large | 145.4 | 1.19 | 434 |

*Fig. 7*

Generating An Insight Template For A Data Chart *902*

Generating A Natural Model Insight From The Insight Template Using A Large Language Model *904*

Distilling The Large Language Model Into A Light Language Model *906*

1000

Receiving A Request For A Natural Model Insight From A Client Device
*1002*

Generating The Natural Model Insight Using A Light Language Model
Distilled From A Large Language Model *1004*

Providing The Natural Model Insight For Display *1006*

GENERATING NATURAL LANGUAGE MODEL INSIGHTS FOR DATA CHARTS USING LIGHT LANGUAGE MODELS DISTILLED FROM LARGE LANGUAGE MODELS

CROSS REFERENCE TO RELATED APPLICATIONS

This application claims the benefit of and priority to U.S. Provisional Patent Application No. 63/491,400, filed Mar. 21, 2023, entitled DISTILLING LANGUAGE MODELS UTILIZING INSIGHT PARAPHRASING, which is incorporated herein by reference in its entirety.

BACKGROUND

In the field of data captioning, large language models have become increasingly effective in various applications, such as generating captions to explain or summarize data represented in charts and graphs. These models, such as Generative Pretrained Transformer 3 ("GPT-3"), have revolutionized data captioning, enabling generation of data captions that paraphrase or summarize large datasets in word form. Despite the advances of existing data captioning systems, however, these prior systems continue to suffer from a number of disadvantages, such as accuracy in generating naturally phrased data captions and computational efficiency in relying on such large, expensive models.

SUMMARY

This disclosure describes one or more embodiments of systems, methods, and non-transitory computer readable media that solve one or more of the foregoing or other problems in the art by generating naturally phrased insights about data charts using light language models distilled from large language models. For example, the disclosed systems distill parameters learned in a large language model for generating natural model insights into a light language model that uses far fewer computational resources. In some embodiments, the disclosed systems train the light language model using specially synthesized training data (e.g., synthesized by the large language model) that is anonymized and augmented to improve the accuracy and robustness of model predictions. For example, the disclosed systems anonymize training data by injecting noise into data charts used to train a light language model. In some embodiments, the disclosed systems further augment the (anonymized) training data by splitting or partitioning training data charts into folds that act as individual data charts. From the synthesized training data, in some cases, the disclosed systems generate insight templates to guide a large language model for generating natural model insights.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 7 illustrates an example table of experimental results for the insight generation system in accordance with one or more embodiments;

DETAILED DESCRIPTION

Figure 1:
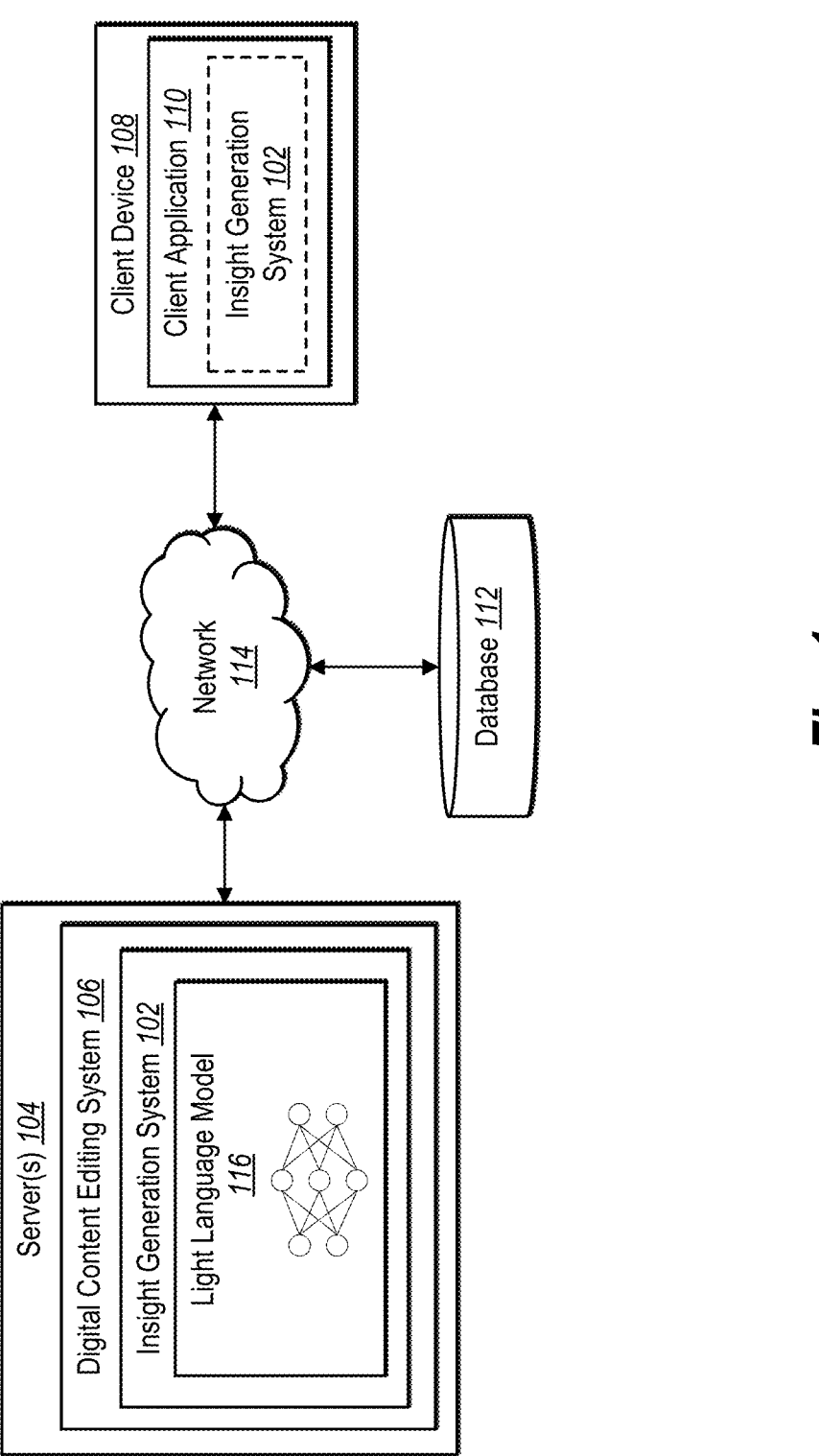
FIG. 1 illustrates an example system environment in which an insight generation system operates in accordance with one or more embodiments.

This disclosure describes one or more embodiments of an insight generation system that generates natural model insights to paraphrase or caption data charts (or graphs) by training and implementing a light language model distilled from a pretrained large language model using anonymized, augmented training data. In some embodiments, the insight generation system synthesizes the training data to train or tune the light language model. Using the synthesized training data, in one or more embodiments, the insight generation system utilizes a data narrator model to generate insight templates that define template structures to guide or inform the generation of natural model insights. Indeed, in certain cases, the insight generation system further prompts a pretrained large language model to generate or predict a natural model insight from an insight template. In some embodiments, the insight generation system further distills the large language model into a light language model by tuning parameters of the light language model such that the light language model generates the natural model insight from the insight template when tuned.

As mentioned above, in some embodiments, the insight generation system described herein synthesizes training data for training a light language model to generate natural model insights. For example, the insight generation system anonymizes a training dataset of data charts (or other tabular data) by injecting noise into various data points to obfuscate the data while retaining a data structure of the data charts. In some cases, the insight generation system further augments the anonymized training data by splitting or partitioning a data chart into multiple folds, where each fold includes a subset of data points and acts as its own data chart for purposes of generating a natural model insight. In some embodiments, the insight generation system utilizes a data narrator model to generate an insight template from the anonymized, augmented training data, where the insight template defines a template structure (e.g., a grammatical structure) for generating natural model insights.

As also mentioned, in one or more embodiments, the insight generation system utilizes a large language model to generate natural model insights from insight templates. For example, the insight generation system utilizes a large language model that includes a large number of parameters and neurons (e.g., 100+ billion parameters) to generate a natural model insight from an insight template. To inform or prompt the large language model, in some cases, the insight generation system provides a set of multiple natural insights (of a particular insight type) generated by a data narrator model, together with an insight template generated by a data narrator model. In some cases, the insight generation system further provides a prompt string (e.g., "paraphrase and summarize") that instructs or queries the large language model to generate a natural model insight for a data chart. In some embodiments, the insight generation system thus prompts the large language model to generate natural language insights based on insight templates (which come from anonymized, augmented training data).

As further mentioned, in certain embodiments, the insight generation system distills (or transfers knowledge of) the large language model into a light language model (e.g., a neural network with a small fraction of the parameters of the large language model). For example, the insight generation system utilizes a supervised distillation process to transfer knowledge of the large language model based on output from the prompting mentioned above. In some cases, the insight generation system distills the large language model into a light language model by tuning parameters of the light language model to replicate or approximate predictions of the large language model. Accordingly, based on receiving a request from a client device to generate a natural model insight for a particular data chart (or graph), in some embodiments, the insight generation system utilizes the tuned light language model to paraphrase or summarize the data within the chart with a high degree of accuracy and with more natural phrasing than is achievable using prior systems.

As suggested above, some prior data captioning systems exhibit a variety of disadvantages or deficiencies, particularly with respect to accuracy and computational efficiency. For instance, some prior systems inaccurately generate data captions that incorrectly represent or describe data represented by a data chart or graph. Indeed, because prior systems often rely on incomplete and/or inaccurate training data that fails to account for certain edge cases, models (including large language models) trained by these prior systems often generate erroneous data captions or insights that incorrectly paraphrase what is reflected by the actual data. Additionally, because prior systems often use models that are prone to overfitting on training examples, these prior systems often generate data captions or insights that are unnaturally and/or incorrectly phrased, making them mechanical in nature and/or difficult or impossible to interpret.

Additionally, some prior systems are computationally inefficient. More specifically, prior systems often rely exclusively on large language models to generate data captions or insights. The operation of large language models takes a substantial amount of computing resources, such as processing power and memory, especially considering the extremely large numbers of parameters within some of these models (e.g., 100+ billion parameters). Not only are these models expensive to train, but they are also expensive to implement at runtime. Thus, for each request or query to generate a data caption in a prior system that uses a large language model, the system expends excessive computational resources that could otherwise be preserved with a more efficient model. Such computational expenses become especially pronounced across systems that process large numbers of requests and generate large numbers of data captions.

As just suggested, embodiments of the insight generation system provide a variety of improvements or advantages over conventional digital image systems. For example, embodiments of the insight generation system improve accuracy over prior systems. Indeed, while some prior systems generate erroneous or incorrect data captions due to incomplete or inaccurate training data, the insight generation system synthesizes training data with an anonymization and augmentation process to generate a training dataset which leads to more accurate natural model insights. In addition, the insight generation system utilizes a specialized training process that includes generating natural insight examples and insight templates to inform the structure and generation of natural model insights or data captions. The insight generation system further distills a large language model into a light language model having far fewer parameters, which prevents overfitting issues exhibited in larger models. As a result, the insight generation system generates natural model insights that are not only more accurate than those of prior systems but also more naturally phrased (and therefore more interpretable).

In addition to improved accuracy, some embodiments of the insight generation system are more computationally efficient than prior systems. Specifically, while some prior systems rely exclusively on computationally expensive large language models to generate data captions or insights at runtime, the insight generation system utilizes a light language model (distilled from a large language model) to generate natural model insights. Thus, the insight generation system preserves significant computer resources compared to prior systems at runtime (e.g., for application after training), without sacrificing the accuracy of large language models. In some cases, the computational savings are substantial, where a large language model of 11 billion parameters (45 GB in size) is distilled into a light language model of 80 million parameters (310 MB in size).

Additional detail regarding the insight generation system will now be provided with reference to the figures. For example, FIG. 1 illustrates a schematic diagram of an example system environment for implementing an insight generation system 102 in accordance with one or more embodiments. An overview of the insight generation system 102 is described in relation to FIG. 1. Thereafter, a more detailed description of the components and processes of the insight generation system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 11.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 11. The client device 108 communicates with the server(s) 104 via the network 114. For example, the client device 108 provides information to server(s) 104 indicating client device interactions (e.g., selections of options to generate natural model insights or other input) and receives information from the server(s) 104 such as natural model insights. Thus, in some cases, the insight generation system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including data charts, graphs, natural model insights, and/or selectable options for generating natural model insights. In some cases, the client application 110 includes all or part of the insight generation system 102 and/or the light language model 116.

As illustrated in FIG. 1, the environment includes the server(s) 104. The server(s) 104 generates, tracks, stores, processes, receives, and transmits electronic data, such as natural model insight generation inputs, data charts, and/or generated natural model insights. For example, the server(s) 104 receives data from the client device 108 in the form of an indication of a client device interaction to generate a natural model insight from a data chart or a graph. In response, the server(s) 104 transmits data to the client device 108 to cause the client device 108 to display or present a generated natural model insight based on the client device interaction.

In some embodiments, the server(s) 104 communicates with the client device 108 to transmit and/or receive data via the network 114, including client device interactions, image editing requests, digital images, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, a container orchestration server, or a machine learning server. The server(s) 104 further access and utilize the database 112 to store and retrieve information such as stored data charts, training data, synthesized training data, generated natural model insights, and/or other data.

As further shown in FIG. 1, the server(s) 104 also includes the insight generation system 102 as part of a digital content editing system 106. For example, in one or more implementations, the digital content editing system 106 is able to store, generate, modify, edit, enhance, provide, distribute, and/or share digital content, such as natural model insights. For example, the digital content editing system 106 provides tools for the client device 108, via the client application 110, to generate natural model insights utilizing the light language model 116.

In one or more embodiments, the server(s) 104 includes all, or a portion of, the insight generation system 102. For example, the insight generation system 102 operates on the server(s) to generate and provide natural model insights. In some cases, the insight generation system 102 utilizes, locally on the server(s) 104 or from another network location (e.g., the database 112), a light language model 116 to generate natural model insights. In addition, the insight generation system 102 includes or communicates with other models, such as a data narrator model and a large language model, for implementation and training.

In certain cases, the client device 108 includes all or part of the insight generation system 102. For example, the client device 108 generates, obtains (e.g., downloads), or utilizes one or more aspects of the insight generation system 102 from the server(s) 104. Indeed, in some implementations, as illustrated in FIG. 1, the insight generation system 102 is located in whole or in part on the client device 108. For example, the insight generation system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the insight generation system 102. For example, in some embodiments, the server(s) 104 train one or more neural networks discussed herein and provide the one or more neural networks to the client device 108 for implementation. In some embodiments, the server(s) 104 train one or more neural networks, the client device 108 requests natural model insights, and the server(s) 104 generate natural model insights utilizing the one or more neural networks. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the insight generation system 102 is implemented by (e.g., located entirely or in part on) the client device 108. In addition, in one or more embodiments, the client device 108 communicates directly with the insight generation system 102, bypassing the network 114. Further, in some embodiments, the light language model 116 includes one or more components stored in the database 112, maintained by the server(s) 104, the client device 108, or a third-party device.

Figure 2:
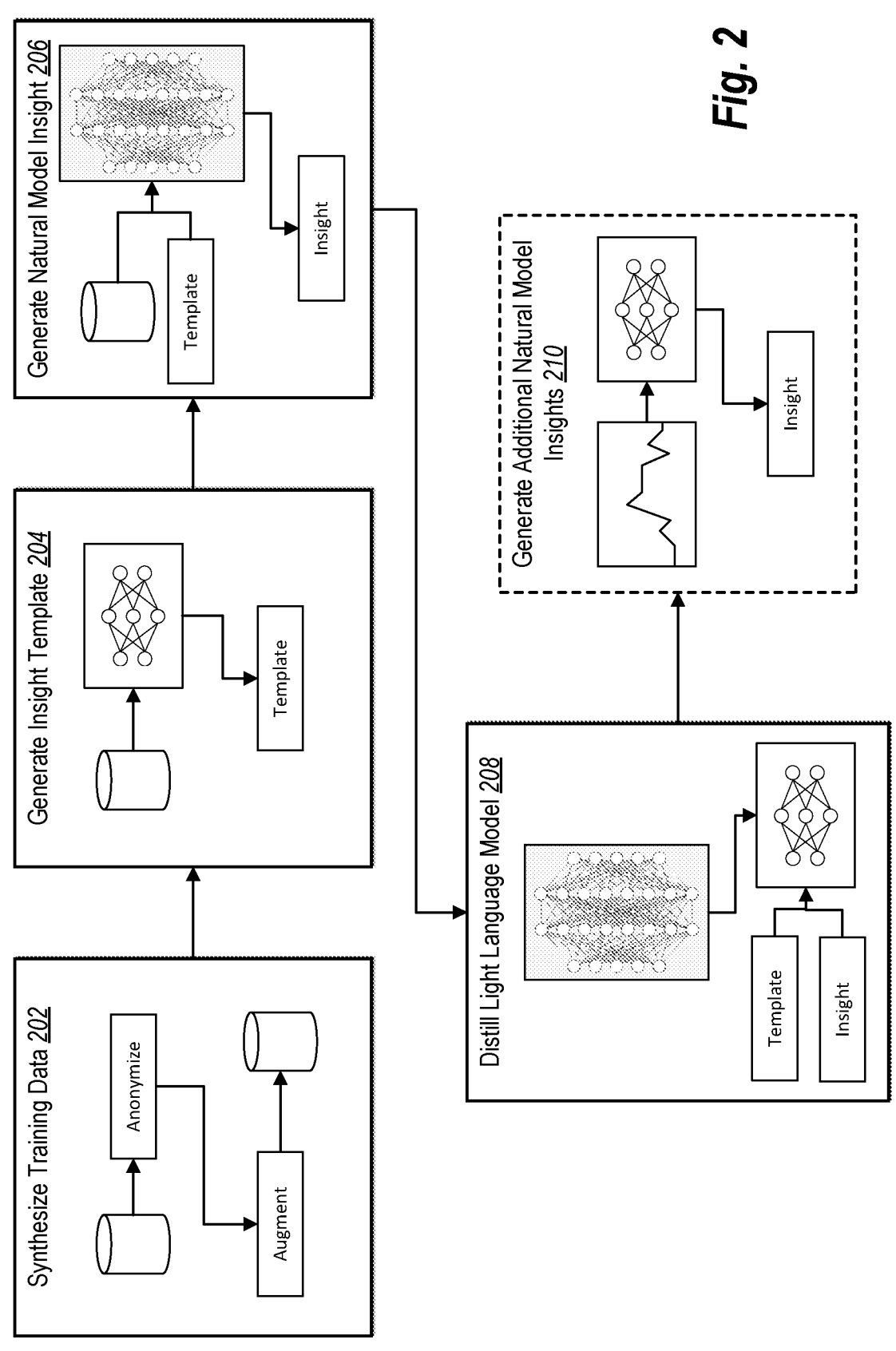
FIG. 2 illustrates an overview of prompting and utilizing a large language model to distill into a light language model for generating natural model insights in accordance with one or more embodiments.

As mentioned, in one or more embodiments, the insight generation system 102 generates and provides natural model insights for data charts or graphs using a light language model distilled from a pretrained large language model. In particular, the insight generation system 102 prompts the large language model using a specialized training dataset and further distills the knowledge of the large language model to a light language model once trained. FIG. 2 illustrates an example overview of prompting a pretrained large language model on specialized data, distilling the large language model into a light language model, and using the light language model to generate a natural model insight in accordance with one or more embodiments. Additional detail regarding the various acts illustrated in FIG. 2 is provided thereafter with reference to subsequent figures.

As illustrated in FIG. 2, the insight generation system 102 performs an act 202 to synthesize training data. In particular, the insight generation system 102 synthesizes a custom training dataset for prompting a large language model to generate natural model insights. In some cases, a large language model includes or refers to a neural network having at least a threshold number of parameters (e.g., at least 500 million parameters or at least 1 billion parameters or at least 10 billion parameters) that can generate predictions in response to text prompts. For instance, a large language model generates a predicted output in the form of a natural model insight that captions, summarizes, or paraphrases a data chart or a graph using natural language phrasing (e.g., in response to a text prompt of "paraphrase and summarize"). Indeed, in some embodiments, a natural model insight includes or refers to a sentence or a string of characters generated by a neural network that explains or summarizes a set of data represented in a chart or graph using natural language phrases. Example large language models in include GPT-3 and Flan-T5 XXL.

In one or more embodiments, a neural network includes or refers to a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network.

As part of synthesizing training data within the act 202, the insight generation system 102 performs a data anonymization process. To elaborate, the insight generation system 102 injects noise into data points of one or more data charts to obfuscate the data points while retaining data structures of the data charts. In some embodiments, a data chart includes or refers to a graphical or tabular representation or visualization of observed or calculated data. For example, a data chart includes data points that indicate values for a first attribute along a first axis with respect to values for a second attribute along a second axis. In some cases, a data chart refers to a line graph (or some other data visualization) that depicts data points having y-axis values for a particular attribute (e.g., clicks, conversions, or units produced) over a particular timeframe represented by the x-axis having a certain granularity or resolution of depicted time intervals (e.g., a minute granularity, an hour granularity, a day granularity, a week granularity, or a month granularity). Indeed, the insight generation system 102 anonymizes the data points of a data chart (or across multiple data charts) by injecting a random noise vector to modify attribute values (e.g., y-axis values) of the data points to values other than actual observed or calculated values for obfuscation.

In addition to data anonymization, the insight generation system 102 synthesizes training data as part of the act 202 by further performing an augmentation process on the (anonymized) training data. In particular, the insight generation system 102 augments training data by splitting or partitioning a data chart (or multiple data charts in a training dataset) into multiple folds. For example, a fold can include or refer to a subset of data points within a data chart segmented or divided along an x-axis parameter (e.g., at particular time intervals). In some cases, a fold refers to a portion of a data chart that acts as a new, smaller data chart over a subset or a sub-window of x-axis values (e.g., a sub-window along the time axis).

In some embodiments, the insight generation system 102 further augments the training data by modifying a granularity associated with a data chart (or associated with one or more folds generated from a data chart). For instance, the insight generation system 102 determines a granularity of attributes along an x-axis (e.g., a time granularity) for a data chart or a fold. In addition, the insight generation system 102 determines one or more adjacent granularities to the determined granularity and generates modified data charts or folds using the adjacent granularities. For instance, the insight generation system 102 determines an initial granularity of daily data and thus augments the data charts/folds from daily data to generate a first augmented set of data charts/folds at an hourly granularity (e.g., a granularity adjacent to the daily granularity in a first direction-lower) and to generate a second augmented set of data charts/folds at a weekly granularity (e.g., a granularity adjacent to the daily granularity in a second direction-higher).

As further illustrated in FIG. 2, the insight generation system 102 performs an act 204 to generate an insight template. To elaborate, the insight generation system 102 generates an insight template from the anonymized, augmented training data by utilizing a data narrator model. Specifically, the insight generation system 102 utilizes a data narrator model to process or analyze the anonymized, augmented training data to generate a predicted insight template that defines a template structure (e.g., a grammatical structure and/or a sentence structure) for generating natural model insights. In some embodiments, an insight template includes or refers to a template the defines a sentence structure for placement or locations of words or word types for filling in as part of a natural model insight. In some cases, an insight template is generated by a data narrator model that includes or refers to a specialized model (e.g., a rule-based model or a machine learning model, such as a neural network) for analyzing tabular data (or data charts) to narrate, summarize, or explain the tabular data in words laid out in a predicted grammatical or sentence structure.

Additionally, the insight generation system 102 performs an act 206 to generate a natural model insight. More specifically, the insight generation system 102 generates a natural model insight by using a large language model to process an insight template together with anonymized, augmented training data. For example, the large language model generates a natural model insight by processing the synthesized training data while adhering to the structure of the insight template. Indeed, the insight generation system 102 prompts the large language model to generate accurate natural model insights using the anonymized, augmented training data and the insight template.

For instance, the insight generation system 102 receives, determines, or generates natural insight examples for a particular insight type corresponding to the insight template. In some cases, an insight type includes or refers to a category or label associated with an insight template and that defines the structure of the insight template. In certain embodiments, different insight types correspond to different formats or structures. Example insight types include:

i) minimum value insights: "On [b]June 10th[/b], the number of visits was [b]30[/b], a sizeable [b]77%[/b] decrease from the average of [b]132[/b]."

ii) maximum value insights: "On [b]June 11th[/b], the visits reached their peak at [b]120[/b], which was [b]130%[/b] more than the average."

iii) period of increase insights: "Between [b]Jun. 14, 2020[/b] and [b]Jun. 14, 2020[/b], visits surged [b]324%[/b], jumping from [b]82[/b] to [b]348[/b]."

iv) period of decrease insights: "From [b]January 26th[/b] to [b]January 26th[/b], the number of visits dropped [b]59%[/b], from [b]4,484[/b] to [b]1,820[/b]"

v) periodic cycle insight: "Every [b]24[/b] hours, there is a cyclic pattern where the highest number of visits happen at [b]6[/b] o'clock and the lowest at [b]14[/b]."

vi) upward trend insights: "From [b]16:00[/b] to [b]16: 00[/b], the average totalhb increased by [b]412[/b] per time-step, going from [b]82.515.24[/b] to [b]96,945.74 [/b] in total."

vii) downward trend insights: "Over the period from [b]January 7th[/b] to [b]February 1st[/b], visits decreased on average by [b]–2[/b] per time-step, falling from [b]10.700[/b] to [b]9,372[/b] in total."

viii) anomaly detection insights: "[b]5[/b] days-[b]June 8th[/b], [b]June 10th[/b], [b]June 14th[/b], and [b]June 15th[/b]-saw abnormal numbers of visits, with a size-able [b]296%[/b] difference from the average of that period."

Other example insights might include line graph insights, bar graph insights, pie chart insights, tabular data insights, conversion insights, production insights, click insights, insights describing an average value, and/or other insight types specific to data formats, descriptions, and/or attributes reflected by the data. The insight generation system 102 thus determines an insight type for the insight template.

In one or more embodiments, the insight generation system 102 further selects a set of natural insight examples to provide to the large language model as training examples to learn to accurately generate natural model insights. For instance, the insight generation system 102 generates or selects a set of natural insight examples that belong to, or reflect, the same insight type as the insight template from the data narrator model. Thus, the insight generation system 102 provides the selected natural insight examples along with the insight template and a text prompt to instruct the large language model to generate a natural model insight.

As further illustrated in FIG. 2, the insight generation system 102 performs an act 208 to distill a light language model. More specifically, the insight generation system 102 distills knowledge from a large language model into a light language model to tune the light language model to replicate or imitate predictions of the large language model using far fewer parameters. For example, a light language model includes or refers to a neural network that includes fewer than a threshold number of parameters (e.g., fewer than 500 million parameters or fewer than 100 million parameters) and that generates predicted outputs based on input data and a text prompt. In certain embodiments, a light language model has less than a threshold percentage or ratio of parameters compared to a large language model. In some cases, the insight generation system 102 tunes parameters of the light language model (e.g., Flan-T5 Small) using a supervised tuning process based on natural model insights.

In addition, in some embodiments, the insight generation system 102 performs an act 210 to generate additional natural model insights. Indeed, the insight generation system 102 utilizes a tuned light language model to generate natural model insights from data charts or graphs in an efficient, accurate fashion. For instance, the insight generation system 102 receives an indication of a request (from a client device) to generate a natural model insight for a particular set of tabular data or for a particular data chart. The insight generation system 102 thus utilizes the light language model to generate a natural model insight to summarize and paraphrase the data reflected in the data chart and provides the natural model insight for display on the client device.

Figure 3:
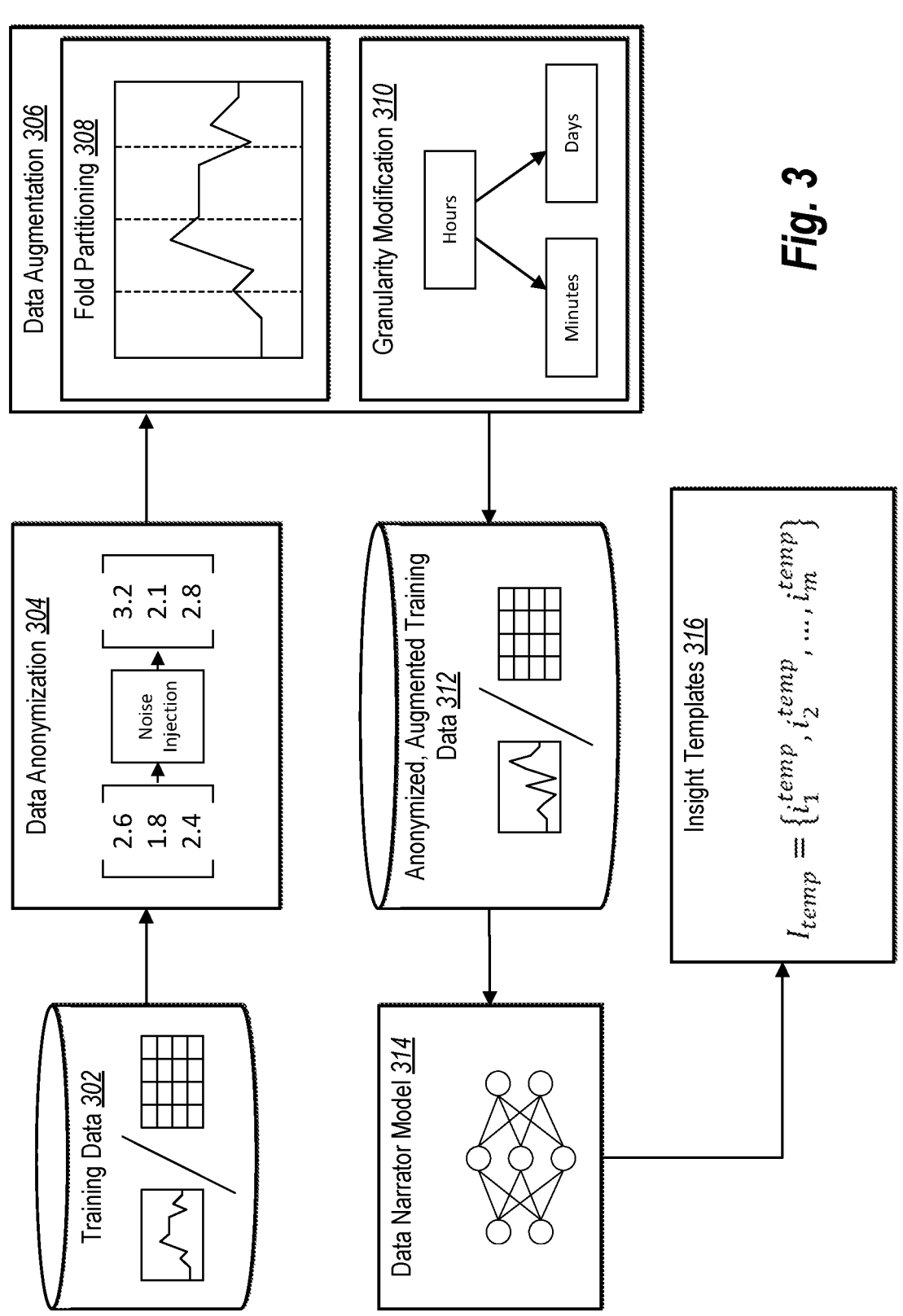
FIG. 3 illustrates an example diagram of generating insight templates from synthesized training data in accordance with one or more embodiments.

As noted above, in certain embodiments, the insight generation system 102 synthesizes training data and generates insight templates for training a (light) neural network to generate natural model insights. In particular, the insight generation system 102 generates insight templates from synthesized training data as a basis for guiding a large language model to generate accurate, naturally phrased, natural model insights. FIG. 3 illustrates an example diagram for generating insight templates from synthesized training data in accordance with one or more embodiments.

As illustrated in FIG. 3, the insight generation system 102 identifies or accesses training data 302. In particular, the insight generation system 102 receives the training data 302 that includes tabular data and/or data charts. In some cases, the training data 302 reflects time-series data values of a variety of types, such as conversions over time, visits over time, units produced over time, or some other data.

As further illustrated in FIG. 3, the insight generation system 102 performs a data anonymization 304. To elaborate, the insight generation system 102 anonymizes the training data 302 by injecting random noise into the data charts. For instance, the insight generation system 102 generates a random noise vector and applies the random noise to the data charts to obfuscate the actual values within the training data 302. As shown, the insight generation system 102 modifies the value 2.6 to 3.2, 1.8 to 2.1, and 2.4 to 2.8 by applying a random noise vector so that the anonymized version of the training data 302 no longer reflects actual, observed values. Instead, the insight generation system 102 anonymizes the training data 302, such that, given a set of data charts $C=\{c_1, c_2, \ldots, c_n\}$, the insight generation system 102 applies random noise to all data point values to ensure that all insights generated from the training data 302 are synthetic in content while real in form/structure. Accordingly, the insight generation system 102 covers a real distribution of insight templates while masking/obfuscating potentially sensitive data originally in C (e.g., the training data 302).

In addition, the insight generation system 102 performs data augmentation 306. More specifically, the insight generation system 102 augments, alters, or modifies the anonymized training data using one or more augmentation processes. For example, the insight generation system 102 performs fold partitioning 308 as part of the data augmentation 306. More particularly, the insight generation system 102 partitions a data chart into multiple sub-charts or folds to increase the amount of training data where each fold functions as its own data chart for insight template generation. In some embodiments, the insight generation system 102 partitions a data chart $c_1$ into a number of f equally sized folds (e.g., where f=3 or some other system-determined or administrator-defined number). This way, the insight generation system 102 generates a set of insight templates from the data chart $c_1$, one for each fold. The insight generation system 102 repeats the fold partitioning 308 for some or all of the data charts C within the (anonymized version of the) training data 302.

In addition, in one or more embodiments, the insight generation system 102 performs granularity modification 310 as part of the data augmentation 306. Specifically, the insight generation system 102 determines a granularity (e.g., an x-axis value interval) associated with a data chart $c_1$ and replicates the data chart $c_1$ in two different, adjacent granularities. For instance, the insight generation system 102 determines a set of available granularities associated with a data narrator model 314 and further determines where the granularity of $c_1$ lies in the scale of available granularities for the data narrator model 314. The insight generation system 102 further generates two copies of the data chart $c_1$, one at a first adjacent granularity smaller than the initial granularity of $c_1$, and another at a second adjacent granularity larger than the initial granularity of $c_1$. For instance, along the scale of granularities associated with the data narrator model 314, the insight generation system 102 determines that $c_1$ has a granularity of hours and thus replicates $c_1$ (or folds generated from $c_1$) into two new versions, one having a minutes granularity and the other having a days granularity (e.g., where minutes and days are granularities adjacent to hours). The insight generation system 102 likewise performs the granularity modification 310 for some or all of the data charts C within the (anonymized version of the) training data 302.

As further illustrated in FIG. 3, the insight generation system 102 thus generates synthesized training data in the form of anonymized, augmented training data 312. Indeed, the insight generation system 102 performs the data anonymization 304 and the data augmentation 306 to data charts C within the training data 302 to generate a set of anonymized, augmented data charts C'.

As shown, the insight generation system 102 further utilizes a data narrator model 314 to generate insight templates 316. More particularly, the insight generation system 102 utilizes the data narrator model 314 to generate the insight templates 316 from the anonymized, augmented training data 312. In some cases, the data narrator model 314 is ADOBE's IntelligentCaptions model. In other cases, the data narrator model 314 is a different model architecture that generates natural language captions or summarizes for tabular data, predicting phrases that explain data visualized in a graph or chart. Indeed, the data narrator model 314 processes the anonymized, augmented (folds of) data charts in C to generate or predict the insight templates 316 which reflect or define template structures for natural model insights, including natural language phrases and placeholders for inserting chart-specific data values and/or data types. In certain embodiments, the insight generation system 102 generates the insight templates 316 in a set $$I_{temp} = \{i_1^{temp}, i_2^{temp}, \dots, i_m^{temp}\},$$

where each of the insight templates corresponds to (or is generated from) a respective data chart (e.g., insight template $$i_1^{temp}$$

is generated or extracted from data chart $c_1$ or from a fold of $c_1$).

Figure 4:
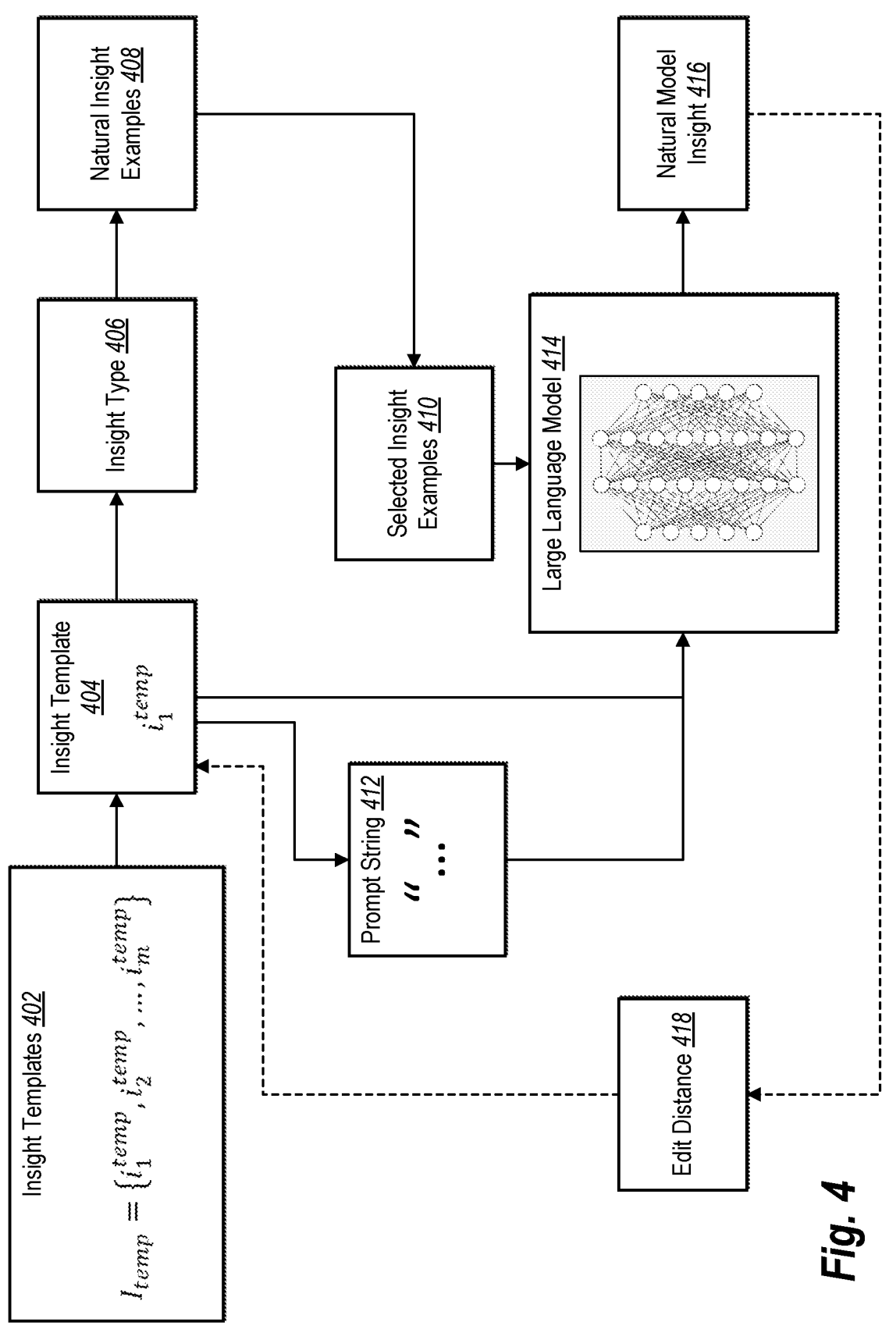
FIG. 4 illustrates an example diagram for generating a natural model insight from an insight template in accordance with one or more embodiments.

As mentioned above, in certain described embodiments, the insight generation system 102 natural model insights from insight templates. In particular, the insight generation system 102 prompts a large language model to generate natural model insights based on insight templates and data charts from the anonymized, augmented training data. FIG. 4 illustrates an example diagram for prompting a large language model to generate a natural model insight in accordance with one or more embodiments.

As illustrated in FIG. 4, the insight generation system 102 generates insight templates 402. Indeed, as just described, the insight generation system 102 generates insight templates 402 from synthesized training data using a data narrator model. The insight generation system 102 further identifies or selects an insight template 404 from among the insight templates 402. As shown, the insight generation system 102 selects the insight template $$i_1^{temp}$$

from the set of insight templates $I_{temp}$. In addition, the insight generation system 102 determines an insight type 406 for the insight template 404. For instance, the insight generation system 102 determines a category associated with the insight template 404 (e.g., a maximum value description of a line graph, a minimum value description of a bar graph, or a description of a value at a particular time within a line graph).

Based on the insight type 406, the insight generation system 102 further determines, receives, or generates natural insight examples 408. For example, the insight generation system 102 determines, receives, or generates a set of insight examples having a particular size (e.g., ten insight examples) for the insight type 406. Indeed, the insight generation system 102 generates the natural insight examples 408 by generating captions or insights (of one or more sentences) that use different phrasing to summarize or explain the data of a corresponding data chart or fold. In some cases, the insight generation system 102 receives the natural insight examples 408 from an administrator device that receives input for manually generating the natural insight examples 408 according to the insight type 406.

As further illustrated in FIG. 4, the insight generation system 102 identifies or selects a set of selected insight examples 410. More specifically, the insight generation system 102 selects or determines the selected insight examples 410 from the natural insight examples 408. In some embodiments, the insight generation system 102 randomly selects a number of insight examples dictated by a token size permitted by a large language model. For instance, the insight generation system 102 determines a maximum token size for a prompt input allowed by a large language model and determines the number of selected insight examples 410 based on the maximum token size (e.g., according to the average number of tokens within each natural insight example). For instance, the insight generation system 102 generates the selected insight examples 410 to have three examples (for a three-shot prompt) based on the Flan-T5 XXL model accepting an input prompt having a maximum of 512 tokens.

As also shown, the insight generation system 102 generates or receives a prompt string 412 for the insight template 404. More particularly, the insight generation system 102 determines a string of tokens or characters that prompt a large language model 414 to generate a natural model insight 416 from the selected insight examples 410 and the insight template 404. For instance, the insight generation system 102 determines (or receives from an administrator device) a prompt string that triggers the large language model 414 to generate a predicted output in the form of the natural model insight 416 (e.g., "paraphrase and summarize"). In addition, the insight generation system 102 inputs the prompt string 412 to together with the insight template 404 and its corresponding selected insight examples 410 into the large language model 414. In turn, the large language model 414 generates the natural model insight 416 to describe or summarize a data chart corresponding to the insight template 404 using natural language phrases. In some cases, the insight generation system 102 uses a particular temperature parameter (e.g., T=0.6) for the large language model 414 to govern the amount or degree of divergence from the insight template 404 (e.g., where higher temperatures result in more creative predictions, and lower temperatures are less creative or more duplicative of the input).

An example input and output for the large language model 414 taking the form of Flan-T5 XXL is provided below:

Input: Paraphrase and summarize: Original: The lowest amount of visits was [b]3[/b] observed on [b]June 16$^{th}$[/b]. It was [b]95%[/b] less than the average of [b]56[/b]. Paraphrased: On [b]June. 16$^{th}$[/b], the lowest number of visits was recorded at only [b]3[/b], a decrease of [b]95%[/b] from the average of [b]56[/b]. Original: The lowest amount of totalcalls_video was [b]3,491.65[/b], which occurred on [b]1:00[/b] and was [b]53%[/b] less than the average of [b]7,394.882[/b]. Paraphrased: At [b]17:00[/b], the totalcalls_video reached its lowest point of [b]3,491.65[/b], which was [b]53%[/b] lower than the average of [b]7,394.882[/b]. Original: The lowest amount of visits of [b]22[/b] appeared on [b]8:00 PM[/b], [b]83%[/b] less than the average of [b]131[/b]. Paraphrased: At [b]8:00 PM[/b], the number of visits was [b]22[/b], a considerable drop of [b]83%[/b] compared to the average of [b]131[/b]. Original: The lowest amount of totalcalls_ad was [b]2,854.89[/b], which occurred on [b]16:00[/b] and was [b]55%[/b] less than the average of [b]6,397.724[/b]. Paraphrased:

Output: The totalcalls_ad was at its lowest at [b]16:00[/b], at [b]2,854.89[/b], which was [b]55%[/b] less than the average of [b]6,397.724[/b].

As shown above, the [b] symbol indicates the start of a modifiable parameter, term, or value that changes based on analyzed data, while [/b] indicates the end of such a parameter, term or value. The output above represents the natural model insight 416 in some embodiments.

As further illustrated in FIG. 4, in one or more embodiments, the insight generation system 102 determines an edit distance 418 (e.g., a Levenshtein distance) associated with the natural model insight 416. To elaborate, the insight generation system 102 performs a validation loop to validate or verify the natural model insight 416. Specifically, the insight generation system 102 determines an edit distance 418 as the distance between a first string (e.g., the natural model insight 416) and a second string (e.g., the insight template 404). In some cases, the insight generation system 102 determines the edit distance 418 as a number of character-level operations (e.g., token changes, such as additions, deletions, and modifications) required to convert one string to another. The insight generation system 102 further compares the edit distance 418 with an edit distance threshold. If the edit distance 418 satisfies the distance threshold, the insight generation system 102 validates the natural model insight 416. If not, the insight generation system 102 repeats some or all of the steps in FIG. 4 to re-draw a set of selected insight examples, increase a temperature parameter by a small (predefined) increment ($\Delta T$), and generate a new natural model insight using the large language model. In some cases, the insight generation system 102 also or alternatively modifies a temperature value of a light language model based on the validation loop of comparing the edit distance with the edit distance threshold (e.g., for a natural model insight generated by the light language model), and further uses the light language model (with the new temperature parameter) to generate a new natural model insight. The insight generation system 102 stops the validation loop upon satisfying the distance threshold and/or reaching a threshold temperature value $T_{max}$.

In some embodiments, the insight generation system 102 iterates over the other insight templates within $I_{temp}$ and repeats the process illustrated in FIG. 4 for each subsequent insight template (e.g., $$i_2^{temp} \text{ to } i_m^{temp}).$$

Specifically, the insight generation system 102 determines an insight type, generates or receives natural insight examples, selects natural insight examples, generates or receives a prompt string, uses the large language model 414 to generate a corresponding natural model insight, and determines an edit distance. Accordingly, the insight generation system 102 adjusts output from the large language model 414 to generate natural model insights for a variety of different types of insight templates and/or for a variety of different prompt strings (to then use for training a light language model).

Figure 5:
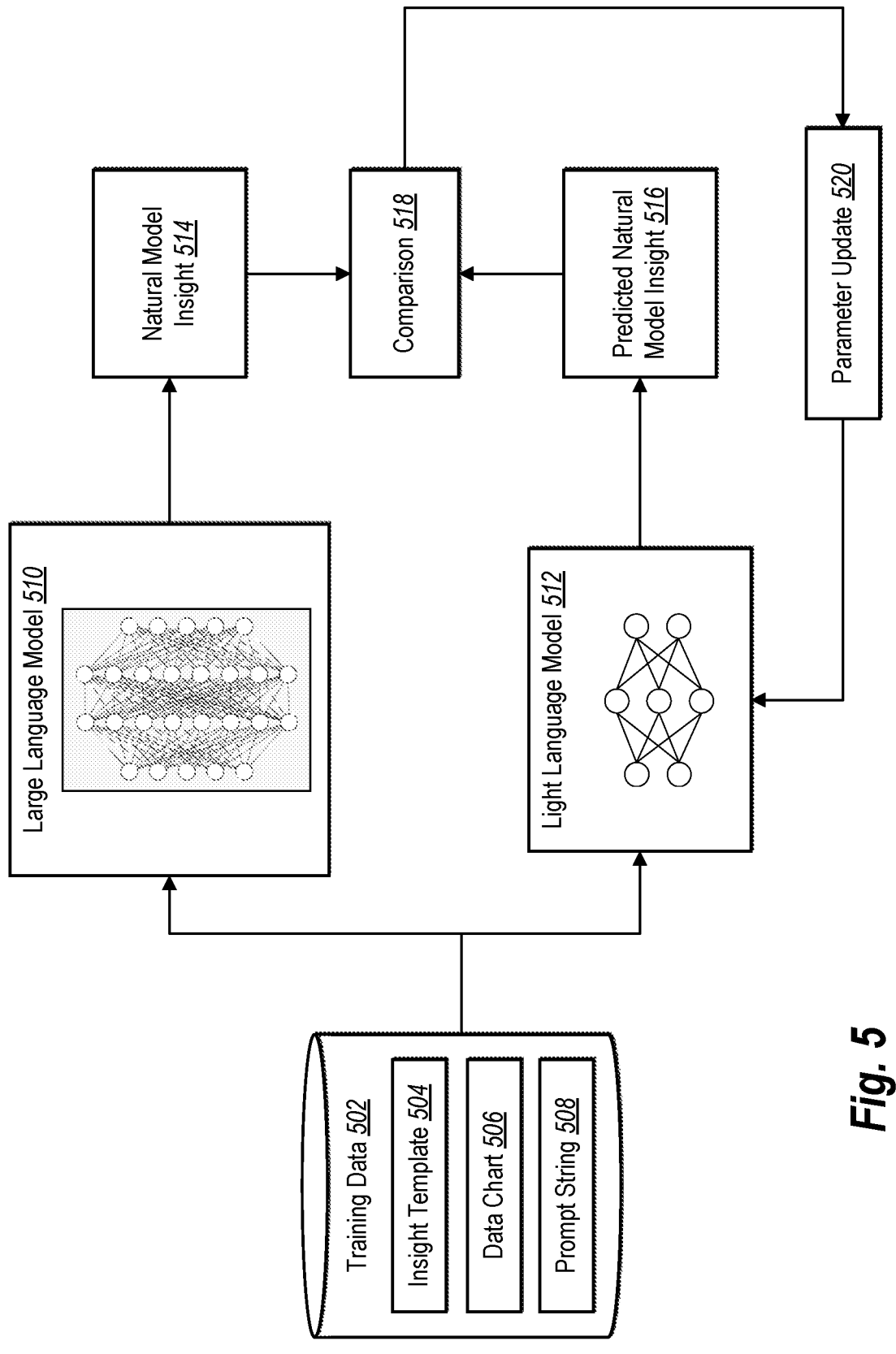
FIG. 5 illustrates an example diagram for distilling a large language model into a light language model in accordance with one or more embodiments.

As noted above, in certain embodiments, the insight generation system 102 distills knowledge from a pretrained large language model into a light language model having a small fraction of the parameters of the large language model. In particular, the insight generation system 102 distills a large language model prompted to generate natural language phrases into a light language model for efficiently generating accurate natural language phrases. FIG. 5 illustrates an example diagram for distilling a large language model into a light language model in accordance with one or more embodiments.

As illustrated in FIG. 5, the insight generation system 102 generates, accesses, or identifies training data 502. More specifically, the insight generation system 102 generates an insight template 504 as described herein. In addition, the insight generation system 102 identifies a data chart 506 corresponding to the insight template 504 (e.g., from which the insight template 504 was generated). The insight generation system 102 also identifies a prompt string 508 (e.g., "paraphrase and summarize") as input to prompt a model to generate a natural model insight.

Additionally, the insight generation system 102 distills knowledge from a large language model 510 prompted on the training data 502 into a light language model 512. For example, the insight generation system 102 utilizes the large language model 510 to generate a natural model insight 514 from the training data (as described above) and further utilizes the light language model 512 to generate a predicted natural model insight 516 from the training data 502 as well. To elaborate, insight generation system 102 utilizes light language model 512 to generate the predicted natural model insight 516 from the training data 502 (e.g., from the insight template 504).

As further illustrated in FIG. 5, the insight generation system 102 performs a comparison 518 as part of the distillation process. More specifically, the insight generation system 102 compares the natural model insight 514 from the large language model 510 prompted on the training data 502 to the predicted natural model insight 516 from the light language model 512 (e.g., generated from the same data chart 506). In some cases, the insight generation system 102 performs the comparison 518 by using a particular loss function (e.g., a mean squared error loss, a cross entropy loss, a distillation loss function, or some other type of loss function) to determine an error or a measure of loss between the natural model insight 514 and the predicted natural model insight 516.

Based on the comparison 518 (e.g., based on the measure of loss), the insight generation system 102 performs a parameter update 520. To elaborate, the insight generation system 102 updates or modifies internal network parameters of the light language model 512, including weights, biases, temperatures, or other modifiable parameters. Indeed, the insight generation system 102 modifies parameters to reduce the measure of loss determined via the comparison 518 (e.g., to accomplish a particular distillation objective function). Repeating the process illustrated in FIG. 5 over multiple iterations or epochs, generating new predictions and performing new comparisons for parameters updates from different training data each time, the insight generation system 102 iteratively updates the parameters of the light language model 512 until the light language model 512 satisfies a threshold measure of loss (or a threshold accuracy).

Over the iterations of the training process, in some embodiments, the insight generation system 102 divides the training data 502 into a training set (e.g., 90% of the data) and a testing set (e.g., 10% of the data). In these or other embodiments, the insight generation system 102 fine tunes the light language model 512 over a particular number (e.g., five) of epochs while using a particular learning rate (e.g., $10^{-5}$). The insight generation system 102 further selects a fine-tuning checkpoint or iteration with the lowest test error (resulting from the comparison 518) as the version of the light language model 512 to use for implementation. Thus, the insight generation system 102 tunes the light language model 512 to generate natural model insights such that $LM_{small}(I_{temp}) \rightarrow I_{nat}$, where $LM_{small}$ represents the light language model 512, $I_{temp}$ represents insight templates, and $I_{nat}$ represents natural model insight generated by the large language model 510.

Figure 6:
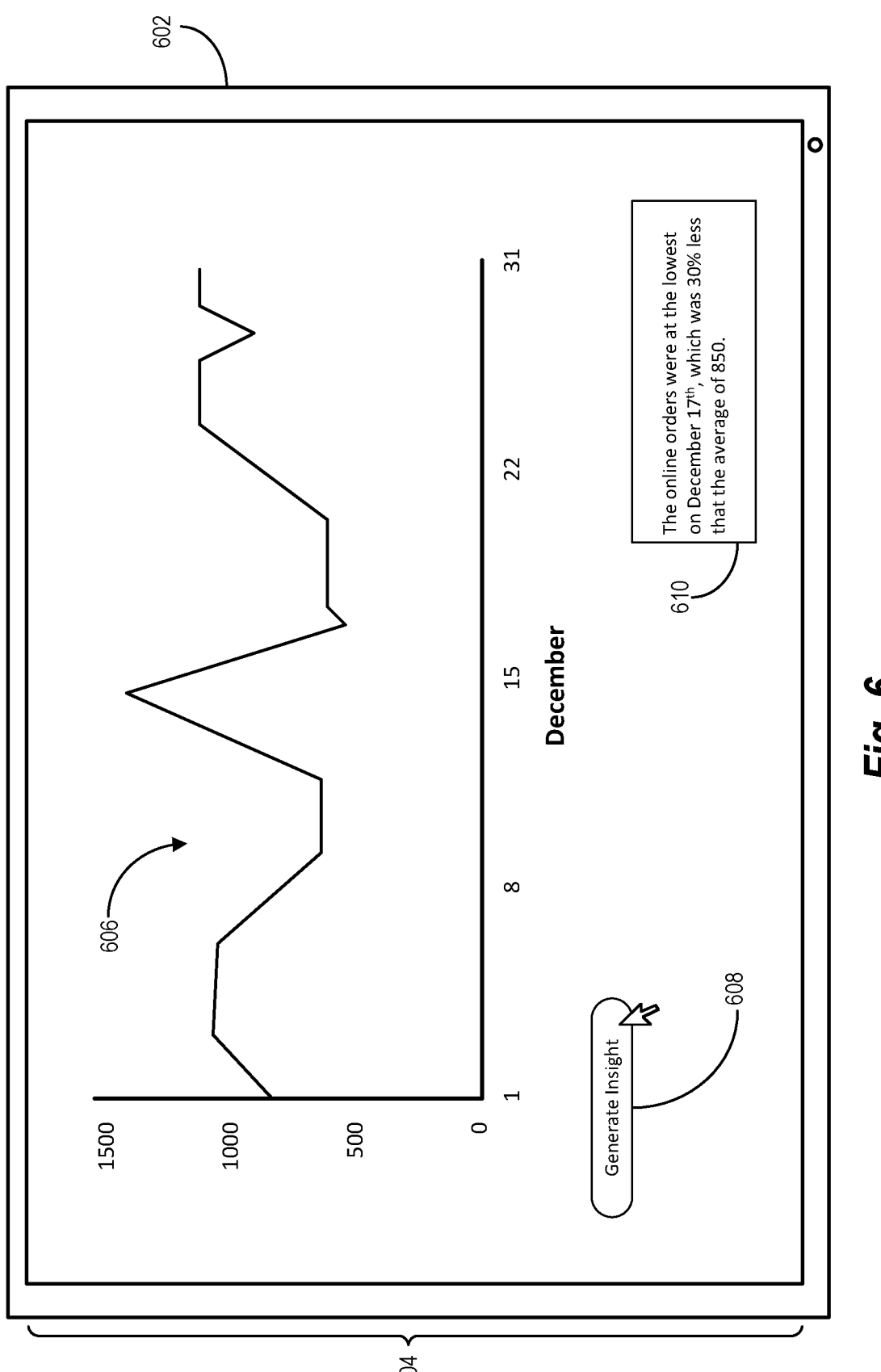
FIG. 6 illustrates an example insight interface for generating and presenting a natural model insight in accordance with one or more embodiments.

As mentioned above, in certain embodiments, the insight generation system 102 generates and provides natural model insights for display on a client device. In particular, the insight generation system 102 utilizes a fine-tuned light language model to generate a natural model insight to provide for display on a client device. FIG. 6 illustrates an example insight interface in accordance with one or more embodiments.

As illustrated in FIG. 6, the client device 602 displays an insight interface 604. The insight interface 604 includes various interface elements, such as a data chart 606 (e.g., a line graph), an insight generation element 608, and a natural model insight 610. Indeed, the insight generation system 102 receives an indication from the client device 602 of a request to generate a natural model insight for the data chart 606. Particularly, the insight generation system 102 receives an indication of a selection of the insight generation element 608 from the client device 602. In some embodiments, the insight generation system 102 receives the request in the form of a text query entered via a query bar within the insight interface 604.

In response to the request, the insight generation system 102 utilizes a light language model to analyze the data from the data chart 606 to generate the natural model insight 610. More particularly, the insight generation system 102 generates the natural model insight 610 to summarize or paraphrase the data chart 606. Indeed, the insight generation system 102 utilizes a light language model distilled from a large language model prompted as described herein to generate the natural model insight 610 accurately and efficiently. Additionally, the insight generation system 102 provides the natural model insight 610 for display within the insight interface 604 presented on the client device 602.

As mentioned above, in some embodiments, the insight generation system 102 generates accurate, naturally phrased model insights. In particular, experimenters have demonstrated that the insight generation system 102 utilizes a light language model distilled from a large language model prompted as described herein to generate natural model insights with a high degree of vocabulary diversity while remaining concise in length. FIG. 7 illustrates a table of example experimental results for the insight generation system 102 in accordance with one or more embodiments.

As illustrated in FIG. 7, the table includes experimental results for three different tests, one for template-based insight generation (the first row), one for insight generation using a fine-tuned Flan-T5 XL model (the second row) distilled from a large language model, and one for insight generation using a fine-tuned Flan-T5 Large model (the third row) distilled from a large language model. As shown, each of the experiments results in comparable numbers for the average number of characters generated per insight and the average number of sentences generated per insight. Indeed, each of the tests result in similar levels of insight conciseness.

Regarding vocabulary diversity (which is a measure of how naturally an insight is phrased), the experimenters demonstrated that the template-based insights included 105 unique tokens, while Flan-T5 XL included 229 unique tokens, and Flan-T5 Large included 434 unique tokens. Interestingly, downsizing the size of the light language model (to a degree) prevents overfitting on the training vocabulary (e.g., the tokens used in natural insight examples and insight templates), which produces an even greater vocabulary (and thus improved naturalness) with the Flan-T5 Large (and other smaller light language models).

Figure 8:
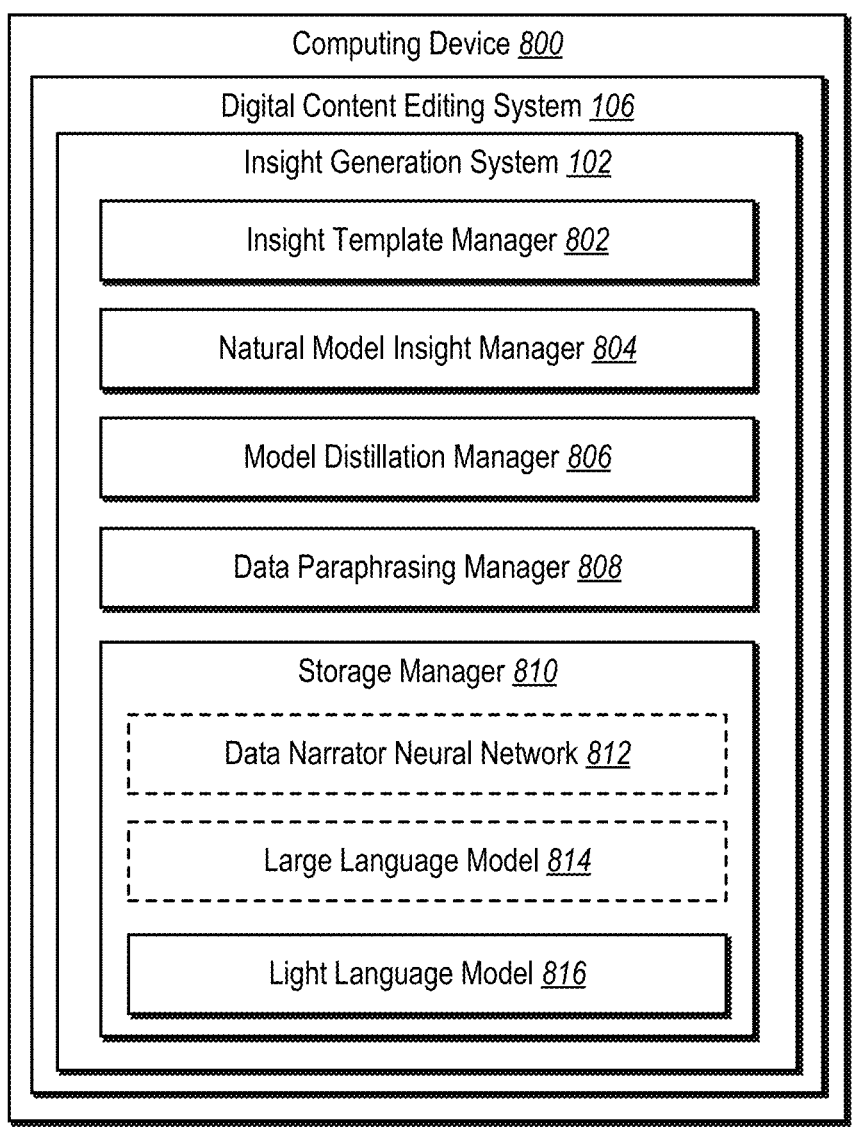
FIG. 8 illustrates an example schematic diagram of an insight generation system in accordance with one or more embodiments.

Looking now to FIG. 8, additional detail will be provided regarding components and capabilities of the insight generation system 102. Specifically, FIG. 8 illustrates an example schematic diagram of the insight generation system 102 on an example computing device 800 (e.g., one or more of the client device 108 and/or the server(s) 104). As shown in FIG. 8, the insight generation system 102 includes an insight template manager 802, a natural model insight manager 804, a model distillation manager 806, a data paraphrasing manager 808, and a storage manager 810.

As just mentioned, the insight generation system 102 includes an insight template manager 802. In particular, the insight template manager 802 manages, maintains, generates, determines, identifies, or extracts insight templates. For example, the insight template manager 802 generates an insight template from tabular data or data charts. In some cases, the insight template manager 802 synthesizes training data using a data anonymization process and a data augmentation process as describe above. In addition, the insight template manager 802 utilizes a data narrator model to generate an insight template from anonymized, augmented training data.

As also shown, the insight generation system 102 includes a natural model insight manager 804. In particular, the natural model insight manager 804 manages, maintains, generates, determines, or extracts natural model insights using a large language model. For example, the natural model insight manager 804 utilizes a large language model to generate a natural model insight from an insight template. In some cases, the natural model insight manager 804 prompts a large language model by generating and utilizing natural insight examples, insight templates, and text prompts as described above.

As further illustrated in FIG. 8, the insight generation system 102 includes a model distillation manager 806. In particular, the model distillation manager 806 manages, maintains, determines, generates, identifies, distills, tunes, or trains a light language model by transferring knowledge from a large language model. Indeed, the model distillation manager 806 distills a pretrained large language model including parameters as described herein into a light language model such that the light language model duplicates or imitates predictions of the large language model.

The insight generation system 102 further includes a storage manager 810. The storage manager 810 operates in conjunction with the other components of the insight generation system 102 and includes one or more memory devices, such as the data narrator model 812, the large language model 814, and the light language model 816. In some cases, the storage manager 810 also stores training data, including insight templates, data charts, and prompt queries for training one or more models described herein.

In one or more embodiments, each of the components of the insight generation system 102 are in communication with one another using any suitable communication technologies. Additionally, the components of the insight generation system 102 are in communication with one or more other devices including one or more client devices described above. It will be recognized that although the components of the insight generation system 102 are shown to be separate in FIG. 8, any of the subcomponents may be combined into fewer components, such as into a single component, or divided into more components as may serve a particular implementation. Furthermore, although the components of FIG. 8 are described in connection with the insight generation system 102, at least some of the components for performing operations in conjunction with the insight generation system 102 described herein may be implemented on other devices within the environment.

The components of the insight generation system 102 include software, hardware, or both. For example, the components of the insight generation system 102 include one or more instructions stored on a computer-readable storage medium and executable by processors of one or more computing devices (e.g., the computing device 800). When executed by the one or more processors, the computer-executable instructions of the insight generation system 102 cause the computing device 800 to perform the methods described herein. Alternatively, the components of the insight generation system 102 comprise hardware, such as a special purpose processing device to perform a certain function or group of functions. Additionally, or alternatively, the components of the insight generation system 102 include a combination of computer-executable instructions and hardware.

Furthermore, the components of the insight generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the insight generation system 102 may be implemented as part of a stand-alone application on a personal computing device or a mobile device. Alternatively, or additionally, the components of the insight generation system 102 may be implemented in any application that allows creation and delivery of content to users, including, but not limited to, applications in ADOBE® EXPERIENCE MANAGER and ADVERTISING CLOUD®, such as ADOBE ANALYTICS®, ADOBE AUDIENCE MANAGER®, and MARKETO®. "ADOBE," "ADOBE EXPERIENCE MANAGER," "ADVERTISING CLOUD," "ADOBE ANALYTICS," "ADOBE AUDIENCE MANAGER," and "MARKETO" are either registered trademarks or trademarks of Adobe Inc. in the United States and/or other countries.

FIGS. 1-8 the corresponding text, and the examples provide a number of different systems, methods, and non-transitory computer readable media for utilizing light language models distilled from large language models to generate natural model insights for data charts. In addition to the foregoing, embodiments can also be described in terms of flowcharts comprising acts for accomplishing a particular result. For example, FIGS. 9-10 illustrate flowcharts of example sequences or series of acts in accordance with one or more embodiments.

Figure 9:
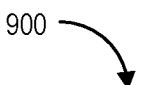
FIG. 9 illustrates an example flowchart of a series of acts for prompting and utilizing a large language model to distill into a light language model for generating natural model insights in accordance with one or more embodiments.
Figure 9:
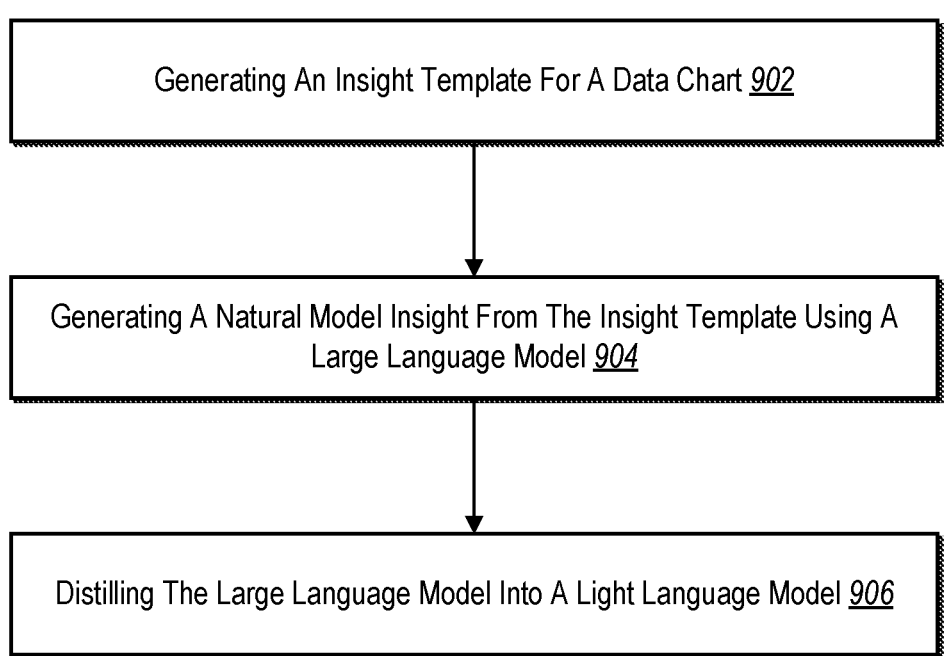
Figure 10:
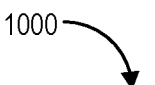
FIG. 10 illustrates an example flowchart of a series of acts for generating and providing a natural model insight using a light language model distilled from a large language model in accordance with one or more embodiments.
Figure 10:
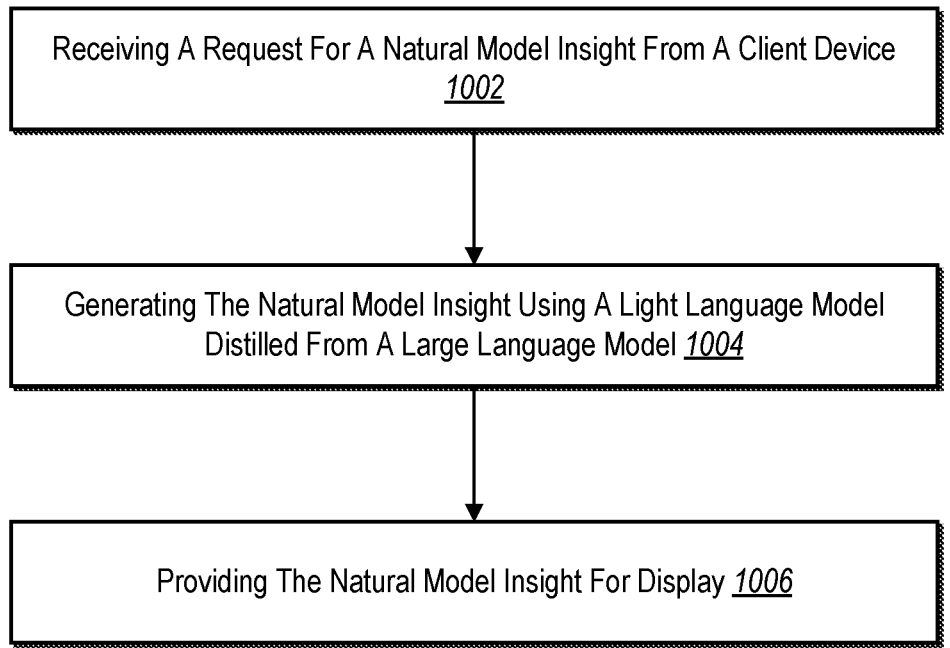

While FIGS. 9-10 illustrate acts according to particular embodiments, alternative embodiments may omit, add to, reorder, and/or modify any of the acts shown in FIGS. 9-10. The acts of FIGS. 9-10 can be performed as part of a method. Alternatively, a non-transitory computer readable medium can comprise instructions, that when executed by one or more processors, cause a computing device to perform the acts of FIGS. 9-10. In still further embodiments, a system can perform the acts of FIGS. 9-10. Additionally, the acts described herein may be repeated or performed in parallel with one another or in parallel with different instances of the same or other similar acts.

FIG. 9 illustrates an example series of acts 900 for distilling a large language model into a light language model for generating natural model insights from data charts. In particular, the series of acts 900 includes acts 902-906. For example, the act 902 includes generating an insight template for a data chart. Specifically, the act 902 involves generating, utilizing a data narrator model to process a data chart, an insight template defining a template structure for generating natural model insights that include natural language descriptions of the data chart. The act 904 includes generating a natural model insight from the insight template using a large language model. Specifically, the act 904 involves generating a natural model insight from the insight template using a large language model to paraphrase the data chart using natural language phrasing while adhering to the template structure of the insight template. The act 906 includes distilling the large language model into a light language model. Specifically, the act 906 involves distilling the large language model into a light language model by tuning parameters of the light language model such that the parameters of the light language model produce the natural model insight from the insight template when tuned.

In some embodiments, the series of acts 900 includes an act of generating the data chart by anonymizing training data to inject noise into data points included in the data chart to obfuscate the data points while retaining a data structure for the data chart. In these or other embodiments, the series of acts 900 includes an act of generating the data chart by augmenting training data by: partitioning the training data into folds within the data chart, wherein the folds correspond to respective natural model insights; and modifying a granularity of the training data within the data chart to generate data points for the data chart at modified intervals.

In certain examples, the series of acts 900 includes an act of generating the natural model insight by paraphrasing anonymized, augmented data within the data chart utilizing the large language model while adhering to the template structure of the insight template. In some embodiments, the series of acts 900 includes an act of generating the natural model insight by: determining an insight type for the insight template generated by the data narrator model; selecting one or more natural insight examples from a set of natural insight examples generated for the insight type; and utilizing the large language model to generate the natural model insight by paraphrasing the data chart according to the one or more natural insight examples for the insight type.

In one or more embodiments, the series of acts 900 includes acts of determining an edit distance between the natural model insight and the insight template, comparing the edit distance with an edit distance threshold, based on comparing the edit distance with the edit distance threshold, updating a temperature value associated with the light language model, and generating, utilizing the light language model, a new natural model insight based on updating the temperature value. In some cases, the series of acts 900 includes utilizing the light language model to generate a new natural model insight from a new data chart according to the parameters tuned by distilling the large language model into the light language model.

In certain embodiments, the series of acts 900 includes synthesizing anonymized training data by injecting noise into data points within a data chart to obfuscate the data points while retaining a data structure for the data chart. In the same or other embodiments, the series of acts 900 includes an act of augmenting the anonymized training data by partitioning the data chart into multiple folds corresponding to respective natural model insights. In some examples, the series of acts 900 includes an act of generating, utilizing a data narrator model to process one or more data points within a fold of the data chart that has been augmented, an insight template defining a template structure for generating natural model insights that include natural language descriptions of the data chart. In certain cases, the series of acts 900 includes an act of generating a natural model insight from the insight template using a large language model to paraphrase the one or more data points within the fold of the data chart using natural language phrasing while adhering to the template structure of the insight template.

In one or more embodiments, the series of acts 900 includes an act of augmenting the anonymized training data by modifying a granularity of the data chart to generate new data points for the data chart divided at different intervals. In these or other embodiments, the series of acts 900 includes an act of generating the natural model insight by: determining insight types corresponding to a set of insight templates generated by the data narrator model; and generating, for each of the insight types, a set of natural insight examples comprising natural language paraphrases of anonymized-augmented data points within the data chart.

In certain cases, the series of acts 900 includes an act of generating the natural model insight by: determining an insight type for the insight template generated by the data narrator model; selecting one or more natural insight examples from a set of natural insight examples generated for the insight type; and utilizing the large language model to generate the natural model insight by paraphrasing the one or more data points within the fold of the data chart while adhering to template structure of the insight template and following the one or more natural insight examples for the insight type. In some embodiments, the series of acts 900 includes an act of validating the natural model insight by determining that the natural model insight satisfies a threshold edit distance in relation to the insight template.

FIG. 10 illustrates a series of acts 1000 for generating a natural model insight from a data chart using a light language model in accordance with one or more embodiments. As shown, the series of acts 1000 includes acts 1002-1006. For example, the act 1002 includes receiving a request for a natural model insight from a client device. Specifically, the act 1002 involves receiving, from a client device, a user interaction requesting a natural model insight to describe a data chart in natural language phrases. In addition, the act 1004 includes generating the natural model insight using a light language model distilled from a large language model. Specifically, the act 1004 involves, in response to the user interaction, generating the natural model insight utilizing the light language model distilled from the large language model to generate natural model insights by paraphrasing data charts using natural language phrases according to insight templates. Further, the act 1006 includes providing the natural model insight for display. Specifically, the act 1006 involves providing the natural model insight for display on the client device.

In one or more embodiments, the series of acts 1000 includes an act of generating the natural model insight by using parameters of the light language model distilled from the large language model prompted using anonymized, augmented data charts. In some examples, the series of acts 1000 includes an act of providing the natural model insight for display on the client device together with a graph depicting a visual representation of the data chart, wherein the natural model insight comprises a natural language paraphrasing of at least a portion of the graph.

In some embodiments, the large language model is prompted to generate the natural model insights using training data anonymized by injecting noise into data charts to obfuscate the data charts while retaining data structures for the data charts. In the same or other embodiments, the large language model is prompted to generate the natural model insights using training data augmented by: partitioning data charts into folds corresponding to respective natural model insights; and modifying a granularity of the training data to generate data points at modified intervals.

In certain cases, the light language model is distilled from the large language model by tuning parameters of the light language model such that, when tuned, the parameters of the light language model produce natural model insights from corresponding insight templates generated by a data narrator model to define template structures for the natural model insights. In some examples, output from the light language model is validated by: determining an edit distance between a sample natural model insight and a corresponding insight template; comparing the edit distance with an edit distance threshold; and modifying a temperature value of the light language model based on comparing the edit distance with the edit distance threshold.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
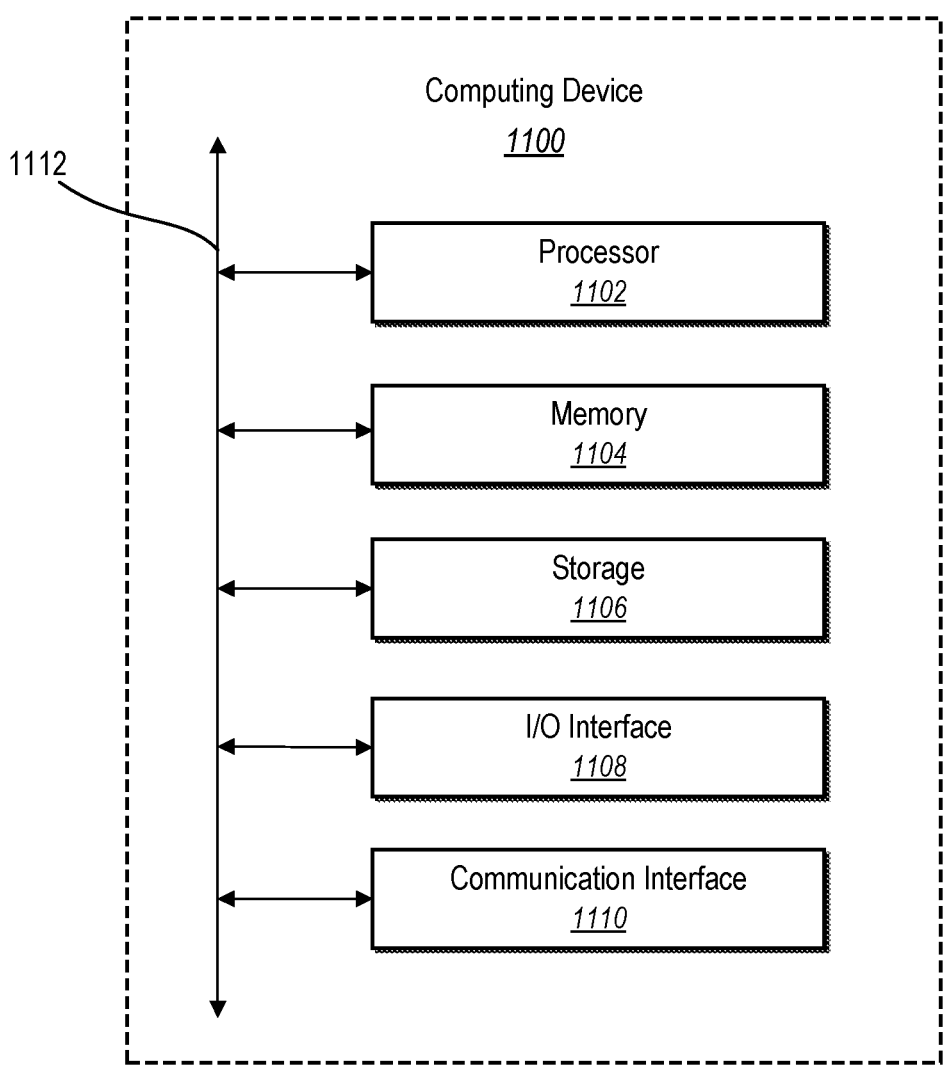
FIG. 11 illustrates a block diagram of an example computing device in accordance with one or more embodiments.

FIG. 11 illustrates, in block diagram form, an example computing device 1100 (e.g., the computing device 800, the client device 108, and/or the server(s) 104) that may be configured to perform one or more of the processes described above. One will appreciate that the insight generation system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, utilizing a data narrator model to process a data chart, an insight template defining a template structure for generating natural model insights that include natural language descriptions of the data chart;
generating, from the insight template, a natural model insight comprising a natural language summarization of the data chart within a threshold degree of divergence from the insight template by using a large language model to paraphrase the data chart using natural language phrasing while adhering to the template structure of the insight template, wherein the threshold degree of divergence is defined according to a temperature parameter for the large language model where higher temperatures result in more creative predictions and lower temperatures result in less creative predictions;
distilling the large language model into a light language model by tuning parameters of the light language model such that the parameters of the light language model produce the natural model insight from the insight template when tuned, the light language model having fewer parameters than a threshold number of parameters, wherein the threshold number of parameters is less than a number of parameters of the large language model; and
generating, in response to prompting the light language model with an additional data chart, an additional natural model insight comprising a natural language summarization of the additional data chart.

2. The computer-implemented method of claim 1, further comprising generating the data chart by anonymizing training data to inject noise into data points included in the data chart to obfuscate the data points while retaining a data structure for the data chart.

3. The computer-implemented method of claim 1, further comprising generating the data chart by augmenting training data by:
partitioning the training data into folds within the data chart, wherein the folds correspond to respective natural model insights; and
modifying a granularity of the training data within the data chart to generate data points for the data chart at modified intervals.

4. The computer-implemented method of claim 1, wherein generating the natural model insight comprises paraphrasing anonymized, augmented data within the data chart utilizing the large language model while adhering to the template structure of the insight template according to a temperature value indicating the threshold degree of divergence.

5. The computer-implemented method of claim 1, wherein generating the natural model insight comprises:
determining an insight type for the insight template generated by the data narrator model;
selecting one or more natural insight examples from a set of natural insight examples generated for the insight type; and utilizing the large language model to generate the natural model insight by paraphrasing the data chart according to the one or more natural insight examples for the insight type.

6. The computer-implemented method of claim 1, further comprising:

determining an edit distance between the natural model insight and the insight template;

comparing the edit distance with an edit distance threshold;

based on comparing the edit distance with the edit distance threshold, updating a temperature value associated with the light language model; and generating, utilizing the light language model, a new natural model insight based on updating the temperature value.

7. The computer-implemented method of claim 5, further comprising:

determining a first insight type corresponding to a first fold within the data chart;

determining a second insight type corresponding to a second fold within the data chart; and selecting one or more natural insight examples from a set of natural insight examples generated for the first insight type and one or more natural insight examples from a set of natural insight examples generated for the second insight type.

8. A system comprising:

one or more memory devices comprising a light language model distilled from a large language model, the large language model prompted to generate natural model insights comprising natural language summarizations of data charts by summarizing data charts using natural language phrases according to insight templates and within a threshold degree of divergence, wherein the threshold degree of divergence is defined according to a temperature parameter for the large language model where higher temperatures result in more creative predictions and lower temperatures result in less creative predictions, the light language model having fewer parameters than a threshold number of parameters, wherein the threshold number of parameters is less than a number of parameters of the large language model; and one or more processors configured to cause the system to:

receive, from a client device, a user interaction requesting a natural model insight to describe a data chart in natural language phrases;

in response to the user interaction, generate the natural model insight comprising a natural language summarization of the data chart by utilizing the light language model distilled from the large language model; and provide the natural model insight for display on the client device.

9. The system of claim 8, wherein the large language model is prompted to generate the natural model insights using training data anonymized by injecting noise into data charts to obfuscate the data charts while retaining data structures for the data charts.

10. The system of claim 8, wherein the large language model is prompted to generate the natural model insights using training data augmented by:

partitioning data charts into folds corresponding to respective natural model insights; and modifying a granularity of the training data to generate data points at modified intervals.

11. The system of claim 8, wherein the light language model is distilled from the large language model by tuning parameters of the light language model such that, when tuned, the parameters of the light language model produce natural model insights from corresponding insight templates generated by a data narrator model to define template structures for the natural model insights.

12. The system of claim 8, wherein output from the light language model is validated by:

determining an edit distance between a sample natural model insight and a corresponding insight template;

comparing the edit distance with an edit distance threshold; and modifying a temperature value of the light language model based on comparing the edit distance with the edit distance threshold.

13. The system of claim 8, wherein the one or more processors are further configured to cause the system to generate the natural model insight by using parameters of the light language model distilled from the large language model using anonymized, augmented data charts.

14. The system of claim 8, wherein the one or more processors are further configured to cause the system to provide the natural model insight for display on the client device together with a graph depicting a visual representation of the data chart, wherein the natural model insight comprises a natural language paraphrasing of at least a portion of the graph.

15. A non-transitory computer-readable medium storing executable instructions that, when executed by a processing device, cause the processing device to perform operations comprising:

synthesizing anonymized training data by injecting noise into data points within a data chart to obfuscate the data points while retaining a data structure for the data chart;

augmenting the anonymized training data by partitioning the data chart into multiple folds corresponding to respective natural model insights;

generating, utilizing a data narrator model to process one or more data points within a fold of the data chart that has been augmented, an insight template from the augmented and anonymized training data defining a template structure for generating natural model insights that include natural language descriptions of the data chart;

generating, from the insight template, a natural model insight comprising a natural language summarization of the data chart within a threshold degree of divergence from the insight template by using a large language model to paraphrase the one or more data points within the fold of the data chart using natural language phrasing while adhering to the template structure of the insight template, wherein the threshold degree of divergence is defined according to a temperature parameter for the large language model where higher temperatures result in more creative predictions and lower temperatures result in less creative predictions; and generating, by utilizing a light language model distilled from the large language model and in response to prompting the light language model with an additional data chart, an additional natural model insight comprising a natural language summarization of the additional data chart.

16. The non-transitory computer-readable medium of claim 15, wherein augmenting the anonymized training data further comprises modifying a granularity of the data chart to generate new data points for the data chart divided at different intervals.

17. The non-transitory computer-readable medium of claim 15, wherein generating the additional natural model insight further comprises distilling the large language model into the light language model by tuning parameters of the light language model such that the parameters of the light language model produce the additional natural model insight from the insight template when tuned.

18. The non-transitory computer-readable medium of claim 15, wherein generating the natural model insight comprises:

determining insight types corresponding to a set of insight templates generated by the data narrator model; and generating, for each of the insight types, a set of natural insight examples comprising natural language paraphrases of anonymized-augmented data points within the data chart.

19. The non-transitory computer-readable medium of claim 18, wherein generating the natural model insight comprises:

determining an insight type for the insight template generated by the data narrator model;

selecting one or more natural insight examples from a set of natural insight examples generated for the insight type; and utilizing the large language model to generate the natural model insight by paraphrasing the one or more data points within the fold of the data chart while adhering to template structure of the insight template and following the one or more natural insight examples for the insight type.

20. The non-transitory computer-readable medium of claim 18, wherein the operations further comprise validating the natural model insight by determining that the natural model insight satisfies a threshold edit distance in relation to the insight template.

\* \* \* \* \*